(12) United States Patent
Chiang et al.

(10) Patent No.: US 7,580,271 B2
(45) Date of Patent: Aug. 25, 2009

(54) APPARATUS AND METHOD FOR SUPPRESSING THE INPUT CURRENT INRUSH FOR A VOLTAGE CONVERTER IN A PRE-CHARGE STAGE

(75) Inventors: Yun-Chi Chiang, Zhubei (TW); Kwan-Jen Chu, Hsinchu (TW); Jien-Sheng Chen, Toufen Town (TW)

(73) Assignee: Richtek Technology Corp., Hsinchu (TW)

( * ) Notice: Subject to any disclaimer, the term of this patent is extended or adjusted under 35 U.S.C. 154(b) by 275 days.

(21) Appl. No.: 11/826,207

(22) Filed: Jul. 13, 2007

(65) Prior Publication Data
US 2008/0310198 A1 Dec. 18, 2008

(30) Foreign Application Priority Data
Jun. 12, 2007 (TW) ............... 96121213 A

(51) Int. Cl.
*H02M 3/335* (2006.01)
(52) U.S. Cl. .............. 363/17; 363/65; 363/19; 315/219; 315/244
(58) Field of Classification Search .......... 363/17, 363/19, 21.01, 65, 98, 127, 21.11; 323/222, 323/224, 272, 286–288; 315/47, 94, 209 R, 315/219, 244
See application file for complete search history.

(56) References Cited

U.S. PATENT DOCUMENTS

| | | | | | |
|---|---|---|---|---|---|
| 5,194,801 | A | * | 3/1993 | Rozman | 322/25 |
| 5,262,934 | A | * | 11/1993 | Price | 363/60 |
| 5,856,739 | A | * | 1/1999 | Trica | 323/222 |
| 6,054,816 | A | * | 4/2000 | Jurek et al. | 315/291 |
| 6,093,975 | A | * | 7/2000 | Peticolas | 290/52 |
| 7,271,642 | B2 | * | 9/2007 | Chen et al. | 327/514 |

* cited by examiner

*Primary Examiner*—Rajnikant B Patel
(74) *Attorney, Agent, or Firm*—Rosenberg, Klein & Lee

(57) ABSTRACT

An apparatus and method are provided for suppressing the input current inrush for a voltage converter in a pre-charge stage. The voltage converter comprises a power input for receiving an input current, a power output for supplying an output voltage for a load, and an output capacitor connected to the power output. In a pre-charge stage, a current limiting device is connected between the power input and the output capacitor to limit the input current to flow therethrough, and a variable current limiting control circuit provides a control signal to the current limiting device to determine a variable maximum value for the input current.

16 Claims, 9 Drawing Sheets

US 7,580,271 B2

APPARATUS AND METHOD FOR SUPPRESSING THE INPUT CURRENT INRUSH FOR A VOLTAGE CONVERTER IN A PRE-CHARGE STAGE

FIELD OF THE INVENTION

The present invention is related generally to a voltage converter and, more particularly, to an apparatus and method for suppressing the input current inrush for a voltage converter in a pre-charge stage.

BACKGROUND OF THE INVENTION

Voltage converters have been widely used for supplying regulated voltages for electronic devices. As shown in FIG. 1, a conventional boost converter 100 has an inductor L connected between a power input VIN and a phase node 106, a transistor 104 as a power switch connected between the phase node 106 and ground GND, an input capacitor CIN connected between the power input VIN and ground GND, a rectifier diode ZD connected between the phase node 106 and a power output VOUT, an output capacitor COUT connected between the power output and ground GND, and a boost control circuit 102 for switching the transistor 104 by a switching signal 103 to convert the input voltage VIN to an output voltage VOUT for supplying for a load RL. However, most of current electronic devices are provided with a protection function of under voltage lockout (UVLO), which will automatically shut down the electronic device if its input voltage is detected to be lower than a predetermined value, and therefore, at the moment the converter 100 is connected to a power source VIN, the output voltage VOUT of the converter 100 may have an initial value so low to cause the input voltage VIN to suffer a severe voltage sag, and thereby to further cause the other electronic devices that share the same power source VIN automatically shut down by the UVLO function. To prevent this accident, a protection function is further provided for the converter 100, which controls the converter 100 to enter into a pre-charge stage when it starts up, for the output capacitor COUT to be charged in advance to a predetermined value, for example VIN.

However, if the converter 100 is turned on after it has been shut down for a time period, or it is hot plug to a power source VIN, the input current Iin will suffer a current inrush due to the sudden charging to the input capacitor CIN and the output capacitor COUT, and the input current inrush may be so large to cause the input voltage VIN to suffer a severe voltage sag, and thereby to further cause the other electronic devices that are also connected to the power source VIN to automatically shut down by the UVLO function. To improve thereto, a conventional boost converter 200 as shown in FIG. 2 is proposed, in which a transistor 208 is connected between the phase node 106 and the output capacitor COUT, a boost control circuit 202 provides two switching signals 103 and 203 to alternatively switch the transistors 104 and 208, respectively, to convert the input voltage VIN to an output voltage VOUT, and a current limiting control circuit 210 is connected to the boost control circuit 202 and the transistor 208. When the converter 200 is hot plug to a power source VIN, it will enter into a pre-charge stage during which the current limiting control circuit 210 provides a control signal 213 to the gate of the transistor 208 to limit the maximum value of the input current Iin that charges the output capacitor COUT. In normal operation, the control signal 213 becomes a switching signal determined by the switching signal 203. However, in this scheme, the maximum value of the input current Iin that can flow through the transistor 208 in a pre-charge stage is constant, and it also limits the maximum value of the load RL accordingly. If the maximum value of the input current Iin in a pre-charge stage is selected higher such that the converter 200 can support a higher maximum loading, then the suppression on the input current inrush will become poorer.

Hence, it is desired an apparatus and method for suppressing the input current inrush for a voltage converter in a pre-charge stage, with capability of pre-charging any load.

SUMMARY OF THE INVENTION

It is an object of the present invention to provide an apparatus and method for suppressing the input current inrush for a voltage converter in a pre-charge stage.

Particularly, the apparatus and method for suppressing the input current inrush for a voltage converter in a pre-charge stage according to the present invention is capable of pre-charging any load in the pre-charge stage.

A voltage converter comprises a power input for receiving an input current, a power output for supplying an output voltage for a load, and an output capacitor connected to the power output for being charged by the input current in a pre-charge stage. According to the present invention, a current limiting apparatus is provided to limit the input current in the pre-charge stage. The current limiting apparatus comprises a current limiting device connected between the power input and the output capacitor for limiting the input current in the pre-charge stage to flow therethrough, and a variable current limiting control circuit for providing a control signal to a control input of the current limiting device to determine a variable maximum value for the input current during the pre-charge stage.

BRIEF DESCRIPTION OF THE DRAWINGS

These and other objects, features and advantages of the present invention will become apparent to those skilled in the art upon consideration of the following description of the preferred embodiments of the present invention taken in conjunction with the accompanying drawings, in which.

DETAIL DESCRIPTION OF THE INVENTION

Figure 2:
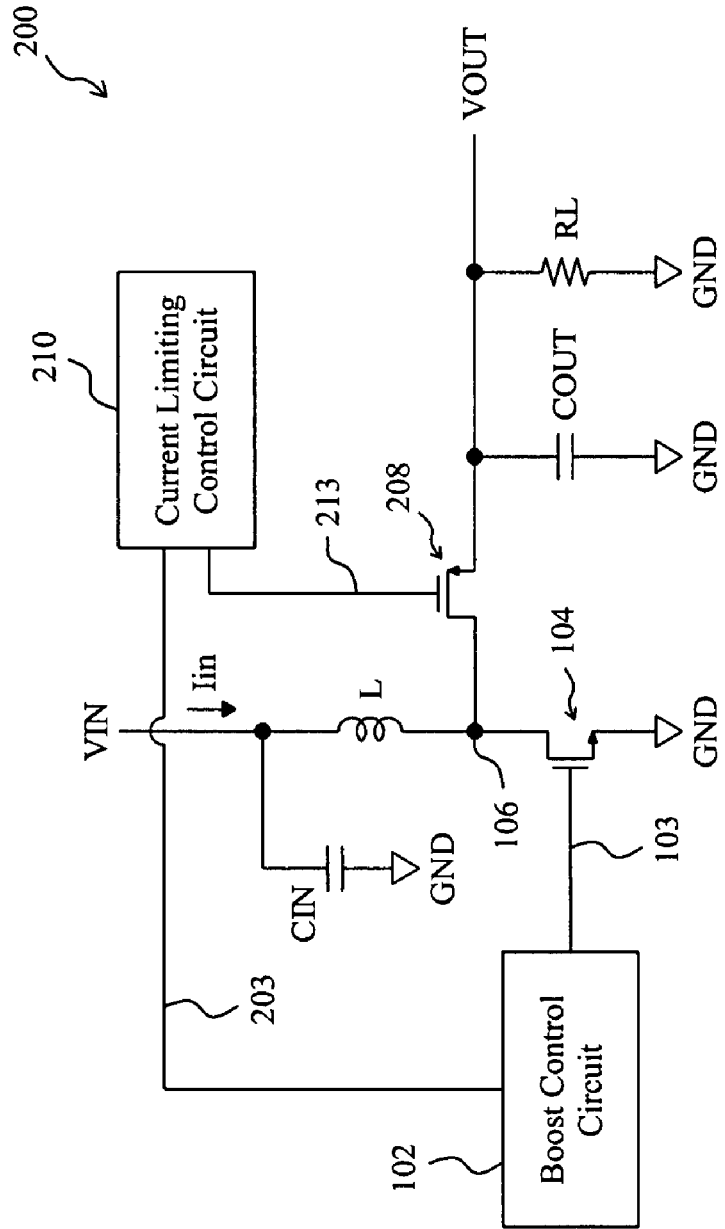
FIG. 2 shows another conventional boost converter.
Figure 3:
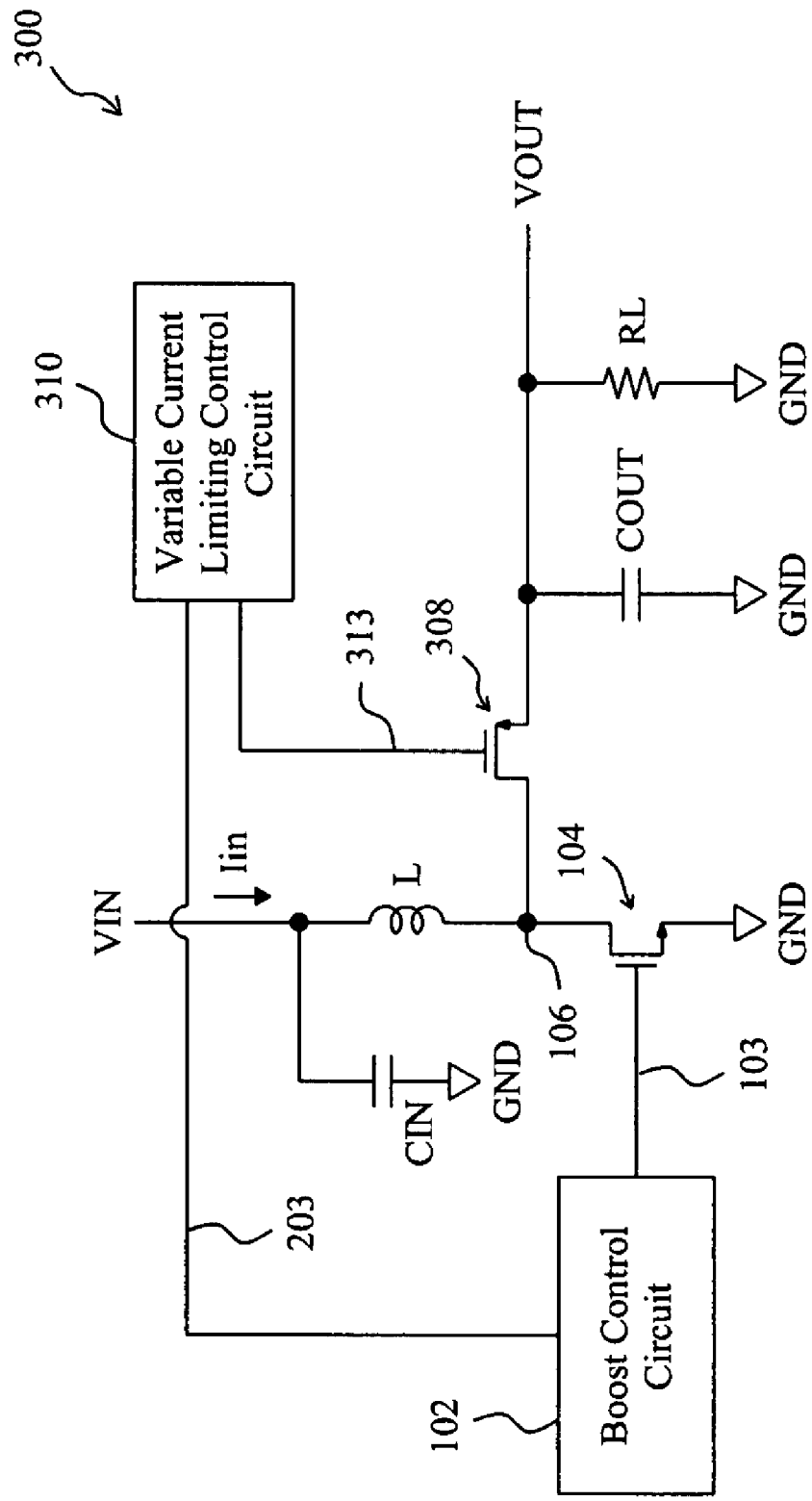
FIG. 3 shows a first embodiment according to the present invention.

FIG. 3 shows a first embodiment according to the present invention, which is designed based on the configuration of FIG. 2 for illustrating the theory of the present invention in a simpler way. A boost converter 300 comprises an inductor L connected between a power input VIN and a phase node 106, a transistor 104 as a power switch connected between the phase node 106 and ground GND, an input capacitor CIN connected between the power input VIN and ground GND, an output capacitor COUT connected between a power output VOUT and ground GND, a boost control circuit 102 connected to the transistor 104, a PMOS 308 connected between the phase node 106 and the output capacitor COUT, and a variable current limiting control circuit 310 connected to the boost control circuit 102 and the PMOS 308. The PMOS 308 and the variable current limiting control circuit 310 constitute a current limiting apparatus to limit the input current Iin that could flow from the power input VIN to the output capacitor COUT in a pre-charge stage. In a pre-charge stage, the PMOS 308 functions as a current limiting device and operates under the control of the variable current limiting control circuit 310, for limiting the maximum value of the input current Iin flowing therethrough. In particular, during a pre-charge stage, the maximum value of the input current Iin is variable, but not constant. For example, when the converter 300 is hot plug to a power source VIN, it enters into a pre-charge stage, and the variable current limiting control circuit 310 controls the PMOS 308 by a control signal 313 to have a variable maximum value for the input current Iin to flow therethrough, such that the input current inrush of the converter 300 will be under a threshold. In an embodiment, the maximum value of the input current Iin in a pre-charge stage is controlled to vary in a gradually increasing manner. For example, the variable current limiting control circuit 310 provides a gradually decreasing voltage 313 to the gate of the PMOS 308 in a pre-charge stage, resulting in that the maximum value of the input current Iin gradually increases during the pre-charge stage. In normal operation, the PMOS 308 serves as a power switch to be switched by a switching signal 203 provided by the boost control circuit 102, for example as that shown in FIG. 3. In this embodiment, the PMOS 308 is employed for simplicity, and in other embodiments, the current limiting device may employ other devices and may include more complicated circuit. Additionally, in other embodiments, the maximum value of the input current Iin may vary in any manners other than a gradually increasing one.

Figure 1:
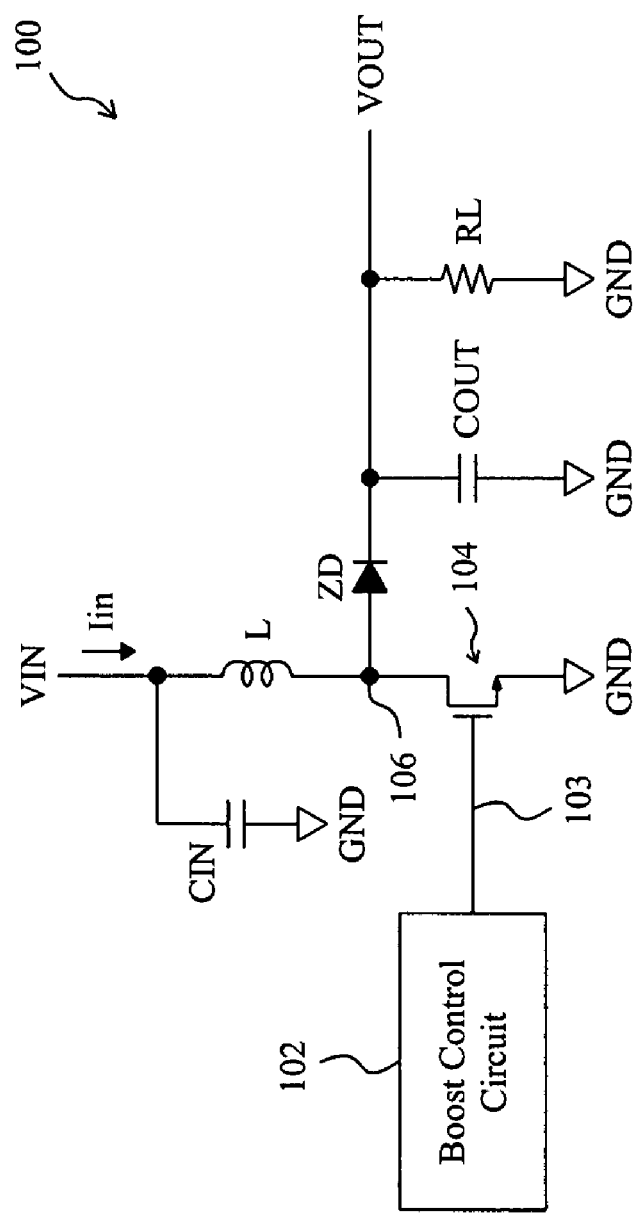
FIG. 1 shows a conventional boost converter.
Figure 4:
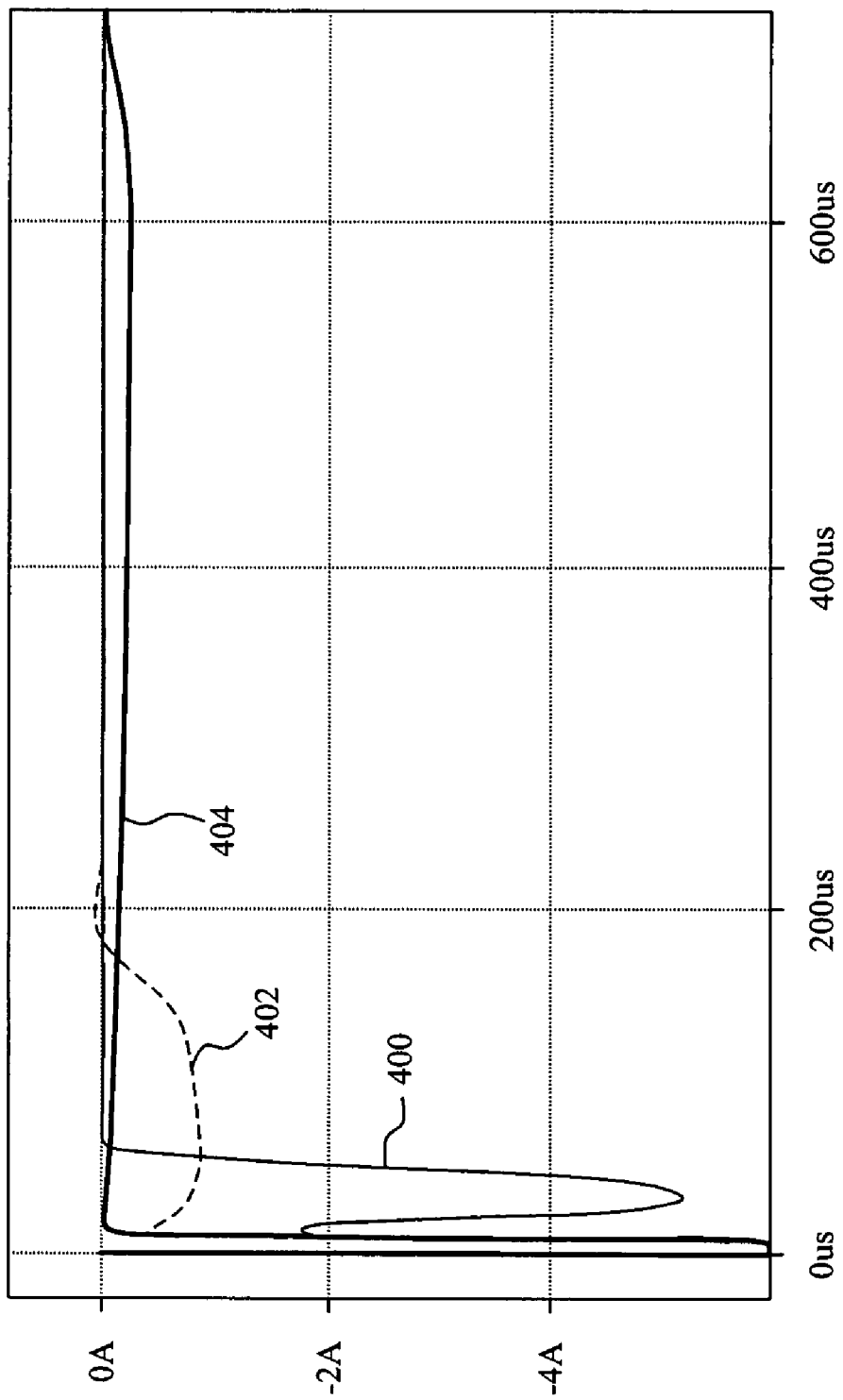
FIG. 4 is a waveform diagram of the input currents of the converters shown in FIGS. 1-3 in a pre-charge stage without any loading.

FIG. 4 is a waveform diagram of the input currents Iin of the converters 100, 200 and 300 shown in FIGS. 1-3 in a pre-charge stage without any loading, in which waveform 400 represents the input current Iin of the converter 100, waveform 402 represents the input current Iin of the converter 200, and waveform 404 represents the input current Iin of the converter 300. When the converters 100, 200 and 300 are hot plug to a power source VIN at time 0 µs, input current inrushes occur in the converters 100, 200 and 300 as a result of suddenly charging the input capacitor CIN, and after the charging to the input capacitor CIN is finished, the input current Iin subsequently charges the output capacitor COUT. Since the converter 100 has no limitation to the input current Iin when pre-charging the output capacitor COUT, a huge input current inrush occurs again, as indicated by the waveform 400. The converter 200 limits the input current Iin by setting a constant maximum value when pre-charging the output capacitor COUT, and therefore the input current inrush is not so severe as that of the converter 100, as indicated by the waveform 402. The inventive converter 300 limits the input current Iin under a gradually increasing maximum value when pre-charging the output capacitor COUT, and therefore the input current Iin gradually increases without any input current inrush, as indicated by the waveform 404.

Figure 5:
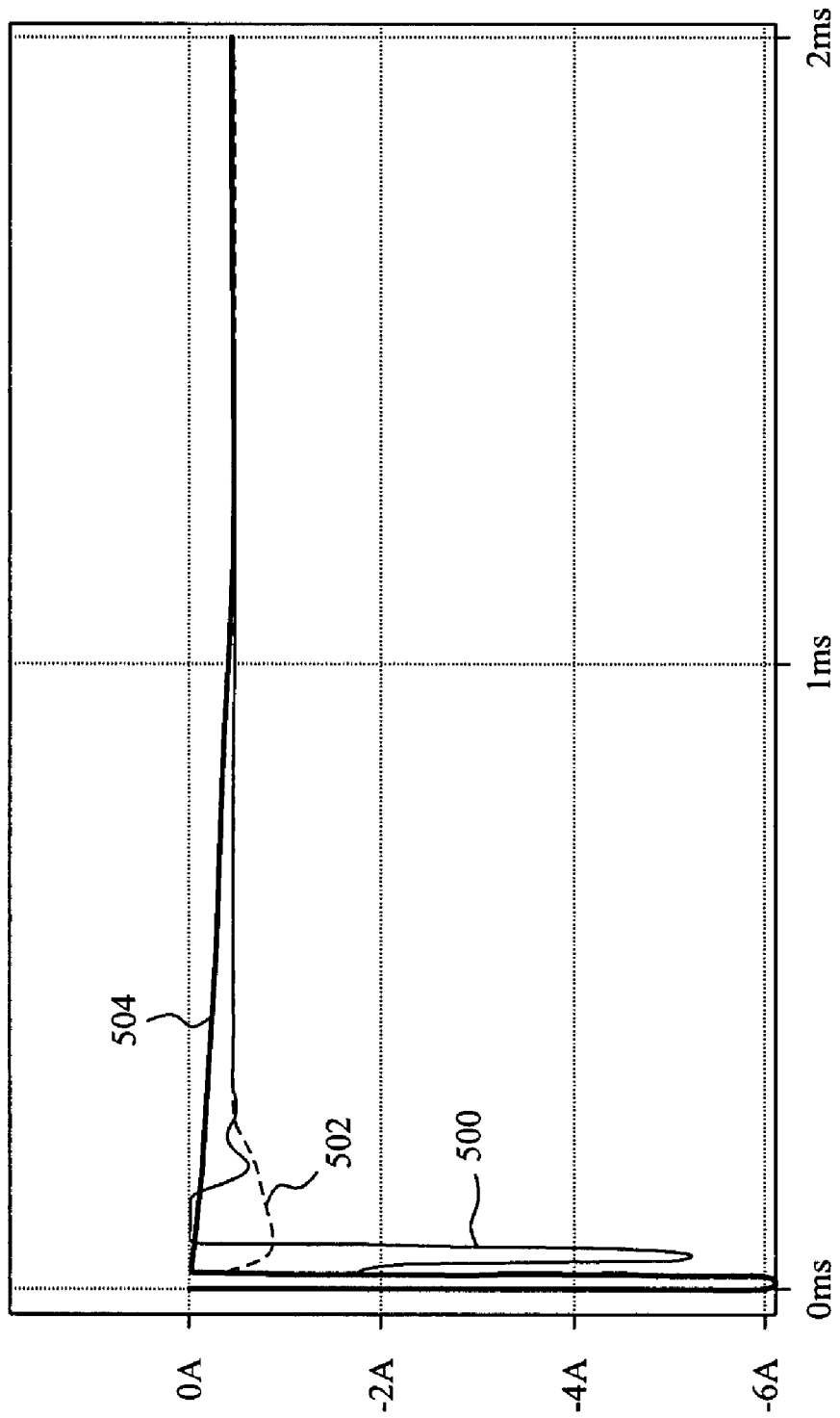
FIG. 5 is a waveform diagram of the input currents of the converters shown in FIGS. 1-3 in a pre-charge stage under a non-zero loading.

FIG. 5 is a waveform diagram of the input currents Iin of the converters 100, 200 and 300 shown in FIGS. 1-3 in a pre-charge stage under a loading of RL=10Ω, in which waveform 500 represents the input current Iin of the converter 100, waveform 502 represents the input current Iin of the converter 200, and waveform 504 represents the input current Iin of the converter 300. When the converters 100, 200 and 300 are hot plug to a power source VIN at time 0 ms, input current inrushes occur in the converters 100, 200 and 300 as a result of suddenly charging the input capacitor CIN, and after the charging to the input capacitor CIN is finished, the input current Iin subsequently charges the output capacitor COUT. Since the converter 100 has no limitation to the input current Iin when pre-charging the output capacitor COUT, a huge input current inrush occurs again, as indicated by the waveform 500. The converter 200 limits the input current Iin by setting a constant maximum value when pre-charging the output capacitor COUT, and therefore the input current inrush is not so severe as that of the converter 100, as indicated by the waveform 502. The inventive converter 300 limits the input current Iin under a gradually increasing maximum value when pre-charging the output capacitor COUT, and therefore the input current Iin gradually increases without any input current inrush, as indicated by the waveform 504.

Figure 6:
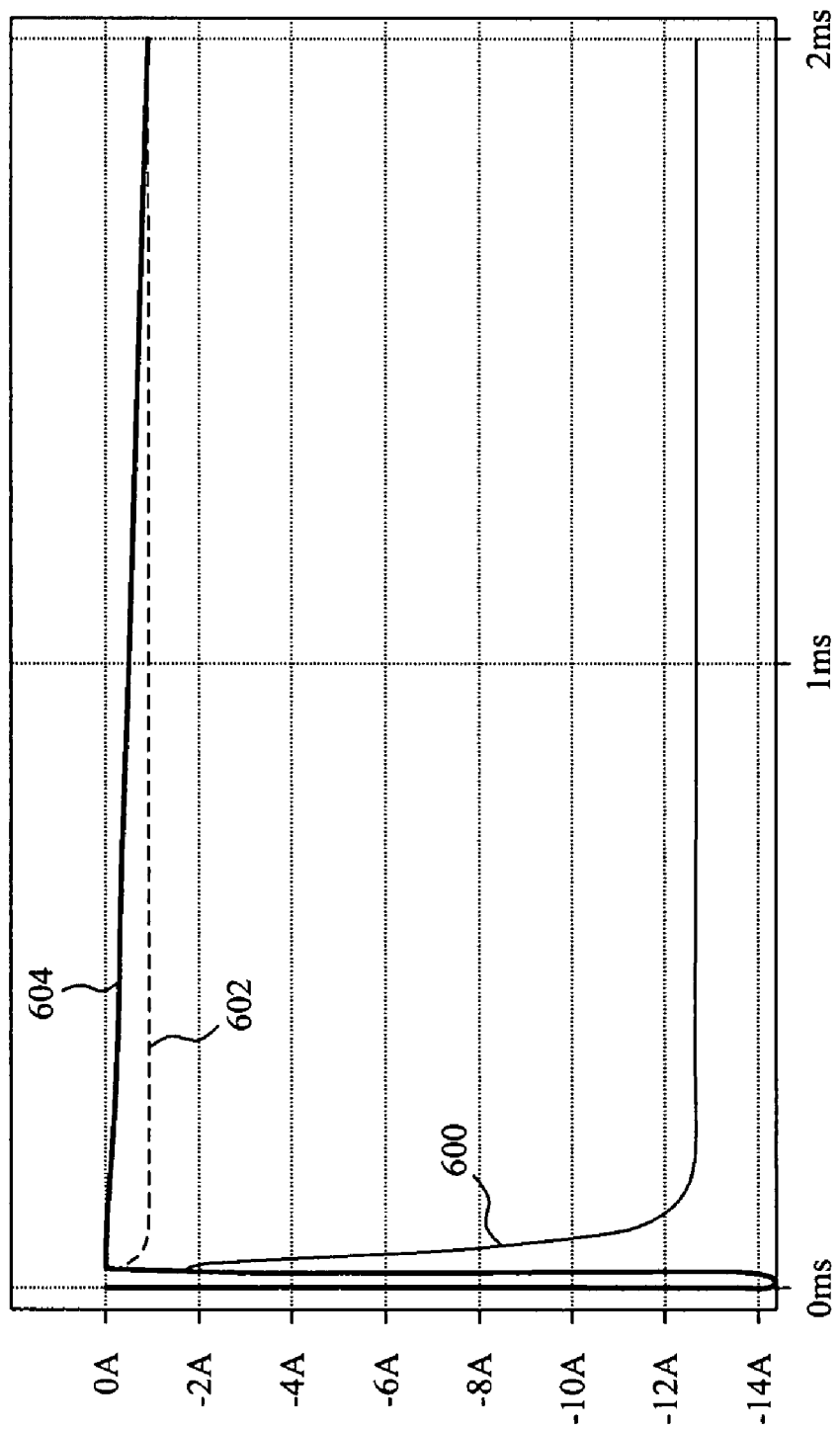
FIG. 6 is a waveform diagram of the input currents of the converters shown in FIGS. 1-3 in a pre-charge stage with their outputs at a pre-short condition.

FIG. 6 is a waveform diagram of the input currents Iin of the converters 100, 200 and 300 shown in FIGS. 1-3 in a pre-charge stage with their outputs VOUT at a pre-short condition, in which waveform 600 represents the input current Iin of the converter 100, waveform 602 represents the input current Iin of the converter 200, and waveform 604 represents the input current Iin of the converter 300. When the converters 100, 200 and 300 are hot plug to a power source VIN at time 0 ms, input current inrushes occur in the converters 100, 200 and 300 as a result of suddenly charging the input capacitor CIN, and after the charging to the input capacitor CIN is finished, the input current Iin subsequently charges the output capacitor COUT. Since the converter 100 has no limitation to the input current Iin when pre-charging the output capacitor COUT, a huge input current inrush occurs again, and then the input current Iin maintains at a post-inrush level, as indicated by the waveform 600. The converter 200 limits the input current Iin by setting a constant maximum value when pre-charging the output capacitor COUT, and therefore the input current inrush is not so severe as that of the converter 100, and then the input current Iin maintains at a post-inrush level, as indicated by the waveform 602. The inventive converter 300 limits the input current Iin under a gradually increasing maximum value when pre-charging the output capacitor COUT, and therefore the input current Iin gradually increases without any input current inrush, as indicated by the waveform 604.

Figure 7:
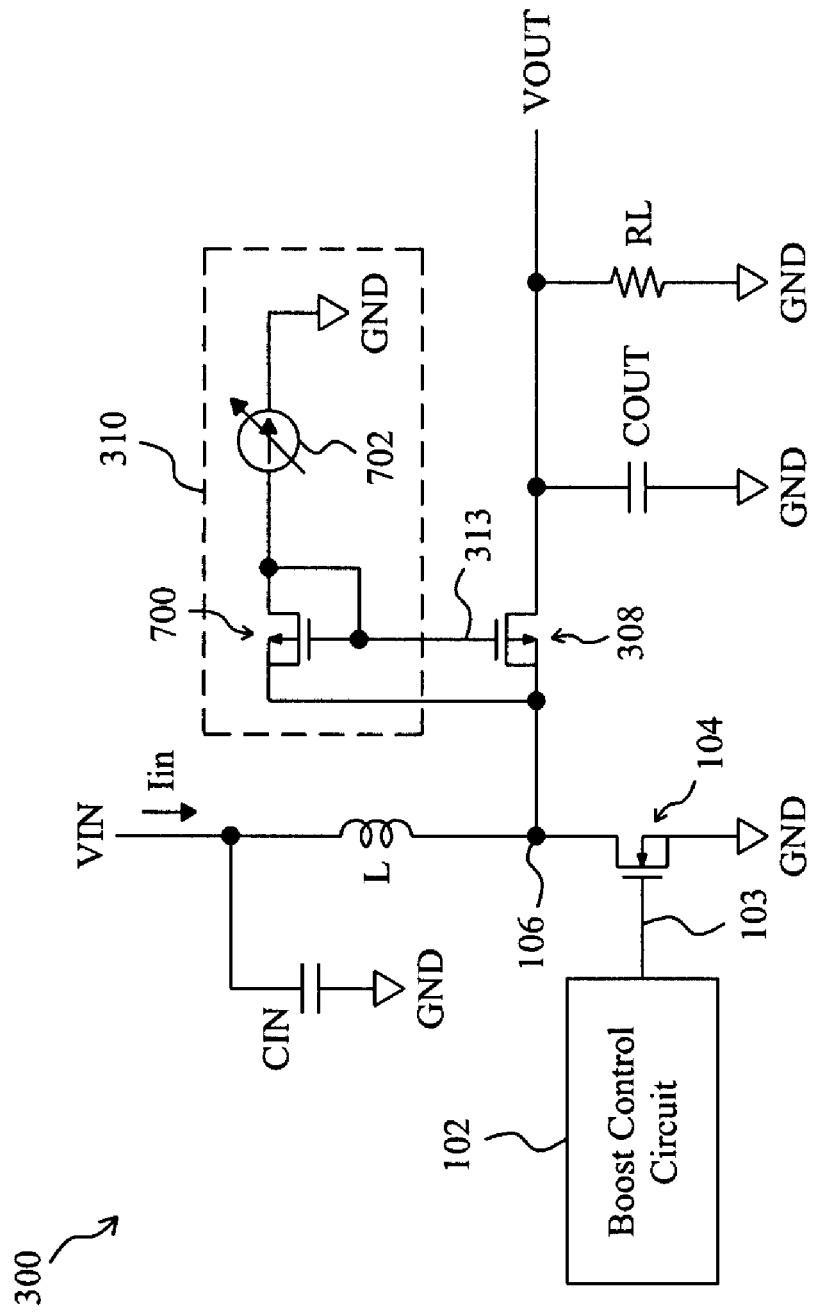
FIG. 7 shows a second embodiment according to the present invention.
Figure 8:
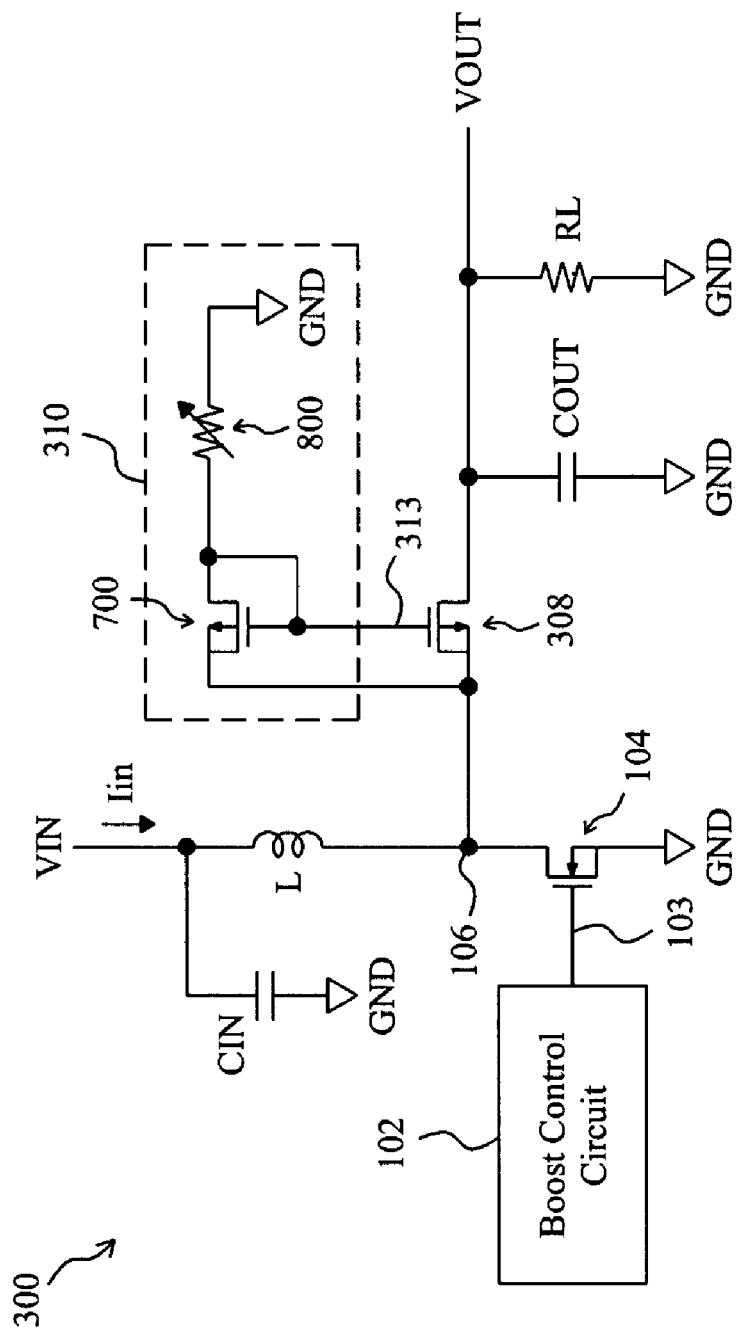
FIG. 8 shows a third embodiment according to the present invention.
Figure 9:
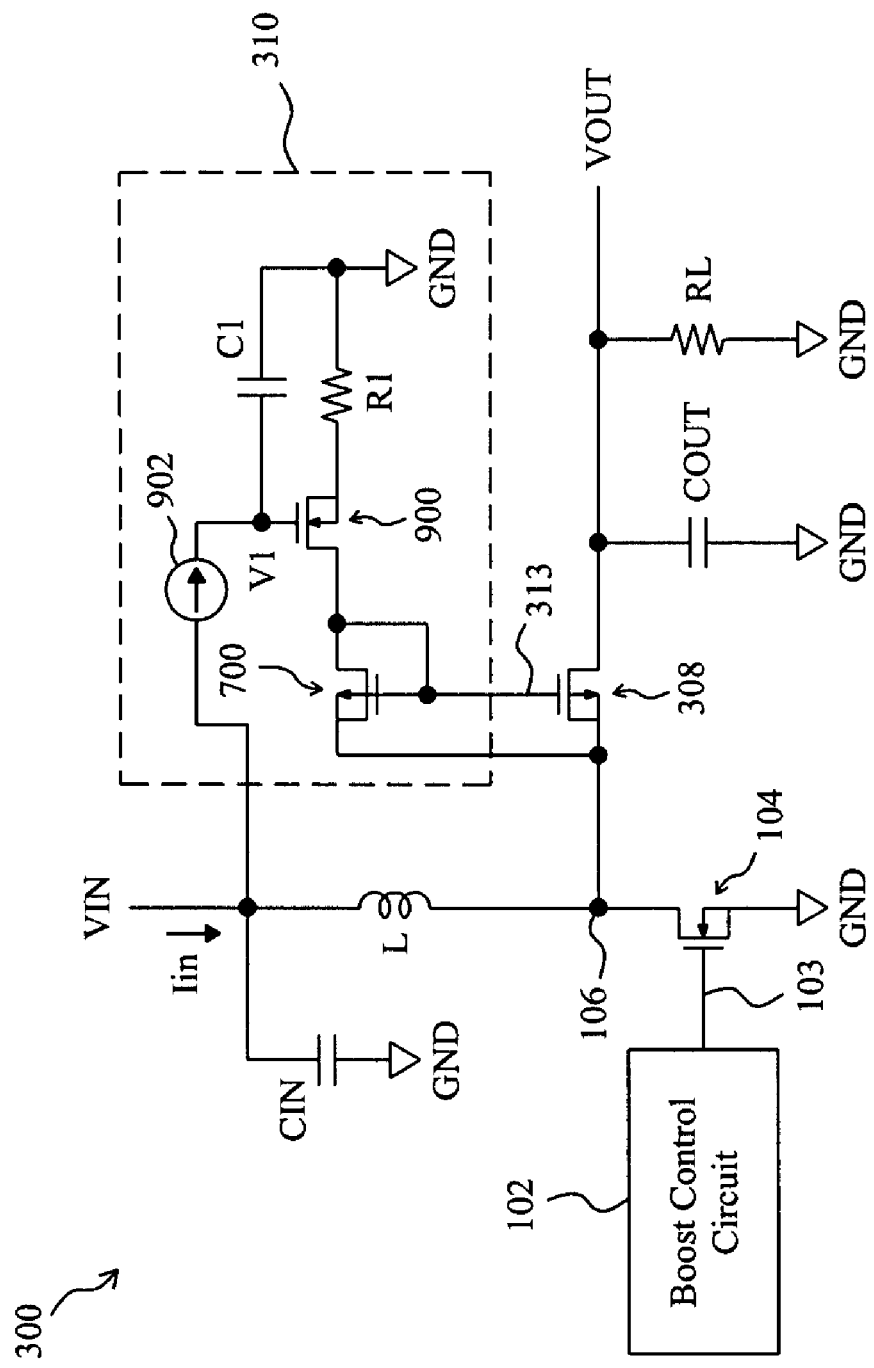
FIG. 9 shows a fourth embodiment according to the present invention.

FIG. 7 shows a second embodiment according to the present invention. Likewise, a transistor 308 is employed as a current limiting device between the power input VIN and the output capacitor COUT. In the variable current limiting control circuit 310, a transistor 700 operates in association with the transistor 308 to be a current mirror whose reference current is provided by a variable current source 702. When the variable current source 702 sources a varying current, the voltage 313 on the gate of the transistor 308 varies correspondingly, and therefore the input current Iin through the transistor 308 is variable under the control of the variable current source 702 in a pre-charge stage. In normal operation, the transistor 308 functions as a diode. FIG. 8 shows a third embodiment according to the present invention, which also employs a transistor 308 as a current limiting device between the power input VIN and the output capacitor COUT, and a transistor 700 in association with the transistor 308 to be a current mirror. For providing a variable reference current for the current mirror, a variable resistor 800 is connected between the transistor 700 and ground GND. When the resistance of the variable resistor 800 varies, the voltage 313 on the gate of the transistor 308 varies correspondingly, and therefore the input current Iin through the transistor 308 is variable under the control of the variable resistor 800 in a pre-charge stage. Likewise, in normal operation, the transistor 308 functions as a diode. FIG. 9 shows a fourth embodiment according to the present invention, in which transistors 308 and 700 are also employed. In the variable current limiting control circuit 310, a transistor 900 and a resistor R1 are serially connected between the transistor 700 and ground GND, a capacitor C1 is connected between the gate of the transistor 900 and ground GND, a current source 902 charges the capacitor C1 to produce a voltage V1 for the gate of the transistor 900. During the current source 902 charges the capacitor C1, the voltage V1 gradually increases to cause the reference current through the transistor 700 gradually increase, resulting in a gradually increasing voltage 313 on the gate of the transistor 308, so as to gradually increase the maximum value of the input current Iin through the transistor 308.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. An apparatus for suppressing the input current inrush for a voltage converter in a pre-charge stage, the voltage converter including a power input for receiving an input current, a power output for supplying an output voltage for a load, and an output capacitor connected to the power output for being charged by the input current in the pre-charge stage, the apparatus comprising:
a current limiting device connected between the power input and the output capacitor for limiting the input current therethrough under a maximum value in the pre-charge stage; and
a variable current limiting control circuit for providing a control signal to a control input of the current limiting device such that the maximum value is variable in the pre-charge stage.

2. The apparatus of claim 1, wherein the current limiting device comprises a transistor controlled by the control signal to conduct the input current therethrough.

3. The apparatus of claim 1, wherein the variable current limiting control circuit controls the current limiting device such that the maximum value gradually increases in the pre-charge stage.

4. The apparatus of claim 2, wherein the variable current limiting control circuit comprising:
a second transistor for operating in association with the first transistor to be a current mirror such that a variable reference current through the second transistor is mirrored to determine the input current through the first transistor; and
a variable current source connected to the second transistor for providing the variable reference current thereto.

5. The apparatus of claim 2, wherein the variable current limiting control circuit comprising:
a second transistor for operating in association with the first transistor to be a current mirror such that a variable reference current through the second transistor is mirrored to determine the input current through the first transistor; and
a variable resistor serially connected to the second transistor for determining the variable reference current.

6. The apparatus of claim 2, wherein the variable current limiting control circuit comprising:
a second transistor for operating in association with the first transistor to be a current mirror such that a variable reference current through the second transistor is mirrored to determine the input current through the first transistor;
a third transistor and a resistor serially connected to the second transistor;
a second capacitor; and
a current source for charging the second capacitor to produce a voltage applied to a gate of the third transistor so as to determine the variable reference current.

7. A method for suppressing the input current inrush for a voltage converter in a pre-charge stage, the voltage converter including a power input for receiving an input current, a power output for supplying an output voltage for a load, and an output capacitor connected to the power output for being charged by the input current in the pre-charge stage, the method comprising the steps of:
determining a variable maximum value for the input current; and
limiting the input current under the variable maximum value in the pre-charge stage.

8. The method of claim 7, wherein the variable maximum value gradually increases in the pre-charge stage.

9. The method of claim 7, wherein the variable maximum value varies from zero in the pre-charge stage.

10. A voltage converter, comprising:
a power input for receiving an input current;
a power output for supplying an output voltage for a load; and
a variable current limiting apparatus for limiting the input current under a variable maximum value in a pre-charge stage.

11. The voltage converter of claim 10, wherein the variable current limiting apparatus gradually increases the variable maximum value in the pre-charge stage.

12. The voltage converter of claim 10, wherein the variable current limiting apparatus comprises a transistor connected between the power input and the power output for limiting the input current in the pre-charge stage.

13. The voltage converter of claim 12, wherein the variable current limiting apparatus further comprising a current limiting control circuit for providing a voltage applied to a gate of the transistor such that the maximum value gradually increases in the pre-charge stage.

14. The voltage converter of claim 10, wherein the variable current limiting apparatus comprises:
a first transistor for conducting a reference current in the pre-charge stage;
a second transistor connected between the power input and the power output, for mirroring the reference current to determine the input current in the pre-charge stage; and
a variable current source connected to the first transistor for providing the reference current in the pre-charge stage.

15. The voltage converter of claim 10, wherein the variable current limiting apparatus comprises:
a first transistor for conducting a variable reference current in the pre-charge stage;

a second transistor connected between the power input and the power output, for mirroring the variable reference current to determine the input current in the pre-charge stage; and a variable resistor serially connected to the first transistor for determining the variable reference current in the pre-charge stage.

16. The voltage converter of claim 10, wherein the variable current limiting apparatus comprises:

a first transistor for conducting a variable reference current in the pre-charge stage;

a second transistor connected between the power input and the power output, for mirroring the variable reference current to determine the input current in the pre-charge stage;

a third transistor and a resistor serially connected to the first transistor;

a second capacitor; and a current source for charging the second capacitor to produce a voltage applied to a gate of the third transistor so as to determine the variable reference current.

* * * * *